3,388,587
METHOD AND COMPOSITIONS FOR INSPECTING LEAKAGE WITH GAS PRESSURE TESTING
Torakichi Hara, Nobuyoshi Hirota, and Yoshio Onoshima, Nagasaki, Japan, assignors to Mitsubishi Jukogyo Kabushiki Kaisha, Tokyo, Japan
No Drawing. Filed July 7, 1965, Ser. No. 470,202
Claims priority, application Japan, July 10, 1964, 39/39,624
8 Claims. (Cl. 73—40)

ABSTRACT OF THE DISCLOSURE

A leakage inspection method which comprises applying gas pressure to a structure and thereafter checking for leaking defective parts, the area to be checked for leakage being covered with an adherent film containing an adhesion agent mixed with a foaming agent in a solvent so that a long-sustaining solid spongy foam mass is formed in said film at leakage points.

---

This invention relates to inspection methods for detecting flaws in structures by subjecting such structures to gas under pressure and to substances adapted for application onto such structures to visually indicate the presence of a leak of gas under pressure through a flaw in such structure.

It is known to test for defective portions or flaws in structures which produce leakage by gas pressure testing, in the following manner:

(1) The structure to be inspected is filled with air or other gas under pressure, or is evacuated, and the pressure difference inside the structure is checked to detect any change due to leakage, for example, by reading a pressure gauge or other suitable instrument;

(2) Soapsuds or other foaming agents are applied to the surface of the test structure, and leakage of gas is detected by foaming or bubbling of the agent;

(3) Air is mixed with a gas such as ammonia, sulfurous acid or the like, and is introduced in the structure under pressure. Leakage is detected by discoloration of a chemical agent which is applied to the surface of the structure or by the use of a gas detector;

(4) The area to be checked for leakage is covered with a thin film of rubber or plastic, and leakage of the gas is detected by inflation of the film.

The known tests have significant deficiencies and shortcomings, as will be shown hereinafter.

For example, in leakage tests of metallic structures, such as in marine vessels under construction, the tests are conducted by the manufacturer and confirmed by an inspection official of the customer. It is often the case, however, that the structures are not tested in the presence of the inspector, and must be subsequently rechecked by the inspector. This is frequently a problem in many industries, wherein it may be convenient to test at one time, while evaluation and confirmation is appropriate at another time. Therefore, an inspection method will be most advantageous, both economically and technically, if it permits the tested parts to be indicated distinctly for many hours after test, so that visual confirmation can be made readily afterwards.

It is an object of the invention to provide such a testing method, whereby the results of the testing will be observable for long periods after such testing.

It is a further object of the invention to provide a substance which can be easily applied to a structure and which can assume a state over prolonged periods of time to indicate the presence of a leak in such structure.

According to the methods heretofore in use, for example, in the method of detecting leakage by measuring changes in internal pressure with a vacuum meter or pressure gauge, it is impossible to locate the exact points of leakage. In the method of detecting leakages by means of bubbles of aqueous soap solution applied to the surface, the bubbles are so short-lived that a lather must be repeatedly applied during inspection. Accordingly, it is impossible to employ such soap solutions in the inspection of large structures.

The inspection method which depends on the chemical reaction of a leaking gas containing ammonia, sulfurous acid or other noxious gas, with a detecting agent, involves a problem of health and safety for the plant workers. Still a further conventional method which uses Freon gas or the like for detection purposes, requires much labor and expenses for large structures, yet with decreased accuracy of inspection. In the other known inspection method in which there is used a thin film of rubber or plastic, the detecting of the inflation of the film is very difficult, while also, the film is fragile.

This invention has for its principal object the provision of a novel method for leakage inspection through gas pressure testing which overcomes the difficulties of the ordinary known methods for gas pressure testing of structures and which is applicable to large structures such as hulls of marine vessels with high accuracy, with safety, and low cost.

Another object of this invention is to provide a method for inspecting leakage with gas pressure testing, using a specific coating agent, so that a solid spongy foam mass is formed which is stable for many hours. The foam mass consists of bubbles which are formed by the subjecting of the agent to gas under pressure.

Other objects and advantages of this invention will become apparent from the following description:

The inspection method according to this invention is characterized by the fact that, in a leakage inspection method which comprises applying gas pressure to a structure and thereafter checking for leaking defective parts, the area to be checked for leakage is covered with an adherent film containing an adhesion agent mixed with a foaming agent, in a solvent so that a long-sustaining solid spongy foam mass may be formed at said coated film at points where pressurized gas may leak.

The adhesive agent which is a principal constituent of the coated film and plays an essential role in the present invention, may be natural or synthetic rubber of well known type, synthetic or natural resins, bitumens, or proteins, effectively used either singly or in suitable combinations. In addition to a solvent for the adhesive agent and the foaming agent, it is possible if desired to employ such additives as a hardening promoter, an antirust agent, pigment filler and an antiseptic. Common organic or inorganic substances of known types may be used suitably and effectively for these purposes.

Accordingly, as synthetic resins there may be used urea-formaldehyde; polyacrylate emulsion resins; polyvinylacetate; polyvinylchloride; polyvinylidene chloride; alkyd resins; copolymers of vinyl chloride and vinyl acetate; acetyl cellulose; and nitro cellulose; acrylic resins such as polyacrylic acid, polyacrylamide, polysodium acrylate and polyammonium acrylate resins; amino resins such as dimethylamine and methoxymethyl melamine; phenolic resins such as phenol formaldehyde, resorcinol formaldehyde, and cresol formaldehyde; and other synthetic resins such as polyvinyl alcohol, ethyl hydroxy cellulose, hydroxycellulose, polyvinyl pyrrolidone and polyvinyl methyl ether.

Suitable synthetic rubbers are nitrile rubber, styrene rubber, chloroprene rubber, polyisobutylene and rubber chloride.

Suitable proteins are gelatin, casein, and albumin.
Suitable bitumens are asphalt and coal tar.
A suitable natural resin is shellac.

Solvents which may be used are water, and organic solvents such as alcohols inclusive of methyl, ethyl, propyl, butyl and amyl alcohols; aromates inclusive of benzene, toluene and xylene; aliphates inclusive of petroleum ether, petroleum benzine, mineral spirits, hexane, and pentane; ketones inclusive of methyl ethyl ketone, acetone, and metyl isobutyl ketone; esters inclusive of methylacetate and ethylacetate; and chlorinated hydrocarbons inclusive of chloromethane, chloroethane, trichloroethylene, and perchloroethylene.

Foaming agents suitable for use with water solvent are inclusive of alkylarylsulfonates such as sodium dodecylbenzene sulfonate, sodium dioctylsulfosuccinate; amine esters such as oleyldiethylethylenediamine; and esters of fatty acid such as polyoxyethylenesorbitan monolaurate.

Foaming agents which are suitable for use with organic solvents are inclusive of anion types such as sodium dioctyl sulfosuccinate, nonion type such as polyoxyethylenedodecylphenolether and cation types such as dodecylhydroxy imidazoline.

When organic solvents are employed there may be used a plasticizer such as ester plasticizers inclusive of dibutylphthalate and tricresylphosphate; and glycol plasticizers inclusive of diethleneglycol and triethyleneglycol.

The composition may further comprise a hardener inclusive of inorganic acids such as phosphoric, chromic and dichromic acids; and organic acids such as benzoic acid.

There may also be utilized a rust inhibitor inclusive of inorgnaic acids such as phosphoric, chromic and dichromic acids; organic acids such as benzoic acid; and fatty substances such as glycerol monooleate, sorbitan monooleate, N-dodecylammonium stearate, dicyclohexylammoniumxylyl stearate and cetyldiethylammonium phenyl stearate.

The composition may additionally include an antiseptic substance such as formaline, thymol, pentachlorophenol, phenol, dodecylhydroxy imidazoline, boric acid and borax.

In order to form the films, in accordance with this invention which develops foam masses upon detection of gas leakage and fixes them as solid spongy foam masses preservable for long periods, it is advisable to prepare beforehand the composition in the form of a paint or paste, either in aqueous or non-aqueous state, but adapted for application onto the surface of the structure to be tested by a brush, sprayer or roller. With such preparation, the method of the invention can be effected with utmost ease and accuracy.

For example, when a paint-like preparation of the above composition is applied with brush, sprayer or other applicator over the area for leakage inspection of a structure, the coated film will foam and form foam masses if the compressed gas inside the structure leaks through any defective portions, and the bubbles of the foam will be hardened by the resultant chemical reaction or by drying with the gas, and will be kept solid for many hours in the form of a spongy foam mass, so that the defective portion of the structure can be detected and inspected conveniently at a desired time afterwards.

The leakage inspection test of the invention will be described in further detail with reference to the following examples.

Example 1

Testing was performed on an oil tank for an oil tanker vessel. The oil tank had a capacity of 10,000 kiloliters. The manholes, pipe joints, hatches and other openings of the oil tank were closed with blind patches and covers. To one or several manholes a blind patch or patches equipped with an air pipe and pressure measurement pipe were fitted. The air pipe was connected with a hose from a compressed air source, and the pressure measurement pipe was connected with a mercury manometer or other suitable pressure instrument. Thereafter, compressed air was forced into the tank until the internal pressure rose to 0.25 kg./cm.$^2$ gauge.

The presence of any leaks in the connection of the blind patches and covers was checked by applying a leak-detecting composition according to the invention to the connections and observing the forming of foam masses. Any defective connection was tightened or otherwise made completely leakproof. The leakage-detecting composition applied to the connections may be identical with that to be used for the leakage test of the tank body. Its constituents will be shown hereinafter.

The pressure inside the tank was adjusted to the pressure above specified, and the leakage-detecting preparation described below was applied immediately to the outer surfaces of riveted or welded parts to be inspected, with a brush, a sprayer device or roller means. At defective parts, air gushed out to form foam masses in the coated film, which foam masses hardened or gelled in ten minutes, and were solidified in the form of cocoon-like bubbles in about two hours, thereby forming a preservable foam mass of sponge-like structure.

The accuracy of the leakage detection attained by the exemplary procedure was compared with that of the ordinary hydraulic test. The results are tabulated hereinunder.

TABLE I

| | Gas pressure method of the invention | Conventional hydraulic method |
|---|---|---|
| Number of leaks detected: | | |
| Riveted parts | 5 | 2 |
| Welded parts | 13 | 7 |

As will be understood from the above table, the accuracy in leakage detection according to the method of this invention is far better than that attained by the conventional hydraulic method.

The leakage-detecting agent used in this example was a preparation of the following composition:

Adhesive promoter: Parts by weight
   Urea resin solution (urea formaldehyde resin content—75%) _____ 2
   Gelatin _____ 2
Foaming agent: (Sodium dioctylsulfosuccinate) ____ 1
Solvent: Water _____ 40
Hardener: 10% phosphoric acid solution _____ 1

The phosphoric acid in the above composition serves as a hardening substance while also having an anti-rust property. Boric acid in an amount of 0.3 part by weight can be added as an antiseptic.

Example 2

In order to detect leaky flaws of welded portions of a steel cylindrical liquid chemical tank having a capacity of 60 kl., an air pressure of 0.25 kg./cm.$^2$ was applied to the inside of said tank, in the same manner as described in Example 1. A detecting agent of the composition as listed hereinafter was applied to the outer surface of the welded portions by means of a sprayer or flow coater. The coated film of the detecting agent immediately bubbled at leaky defective points. In 10 minutes, the bubbles were gelled and, in about two hours, became a spongy foam mass preservable for long periods. The detection accuracy attained by the foregoing procedure was, as shown in the following table, again superior to that according to the known hydraulic testing method.

TABLE II

| | Gas pressure method of the invention | Conventional hydraulic method |
|---|---|---|
| Number of leaks detected: Welded portions | 8 | 3 |

The composition of the detecting agent used in this example was as follows:

| Adhesive promoter: | Parts by weight |
|---|---|
| Emulsion of polyacrylic ester resin (solid content—50%) | 2 |
| Gelatin | 2 |
| Foaming agent: (Sodium dodecylbenzenesulfonate) | 0.2 |
| Solvent: Water | 100 |

The polyacrylate emulsion in the above example is inclusive of polyacrylic acid, polyacrylic amide, polysodium acrylate, and polyammonium acrylate. In the above composition may be added 0.5 part of boric acid as an antiseptic and phosphoric acid as a hardener and rust inhibitor.

The solid content for the adhesive promoter may be supplied other than from the polyacrylic resin by natural isoprene rubber; synthetic ruber such as nitrile, styrene, or chloroprene rubber; synthetic resin such as polyvinyl acetate, polyvinyl chloride, polyvinylidene chloride, alkyd resins, amino and phenolic resins or the like; and bituminous substances such as asphalt coal tar or the like.

Example 3

The following composition was found suitable for use as in Examples 1 and 2:

| Adhesive promoter: | Parts by weight |
|---|---|
| Phenolic resin (phenol-formaldehyde resin with 50% solid content) | 2 |
| Gelatin | 2 |
| Foaming Agent: Sodium dodecylbenzenesulfonate | 0.2 |
| Solvent: Water | 50 |
| Hardener: 10% phosphoric acid solution | 1 |
| Antiseptic: Dodecylhydroxy imidazoline | 0.2 |

In general, a suitable composition containing water as a solvent can be composed of the following:

| | Percent by weight |
|---|---|
| Adhesive promoter | 2–2 |
| Foaming agent | 0.2–2 |
| Antiseptic | 0.3–2 |

The remainder being principally water with incidental quantities of hardener and rust inhibitor in an amount generally less than 5%. The adhesive promoter, foaming agent antiseptic, hardener, and rust inhibitor are added to the water and produce a solution with a pH between 3 and 6.

Since in Examples 1–3 water is used as the solvent, there is no risk of fire or explosion and the composition is adapted for general usage.

The following adhesive promoters have been found effective in Examples 1–3 in addition to those shown and within the range as specified above.

Synthetic resins:
  Polyvinylacetate
  Polyvinylchloride
  Polyvinylidenechloride
  Alkyd resins
  Dimethylolmelamine
  Methoxy methyl melamine
  Resorcinol-formaldehyde resin
  Cresol-formaldehyde resin
  Polyvinyl alcohol
  Ethylhydroxy cellulose
  Hydroxy cellulose
  Polyvinyl pyrrolidone
  Polyvinyl methyl ether Synthetic rubber:
  Nitrile rubber
  Styrene rubber
  Chloroprene rubber
  Natural isoprene rubber Proteins:
  Casein
  Albumin Bitumens:
  Asphalt
  Coal tar The following foaming agents have been found effective in Examples 1–3 in addition to those shown and within the range as specified above.

Dodecylbenzenesulfonic acid
Oleyldiethylethylenediamine
Polyoxyethylenesorbitanmono laurate The following rust inhibitors have been found effective in Examples 1–3 in addition to those shown and within the range as specified above:

Chromic acid
Dichromic acid
Benzoic acid
Glycerol monooleate
Sorbitan monooleate
N-dodecylammonium stearate
Dicyclohexylammoniumxylyl stearate
Cetyldiethylammonium phenyl stearate The following hardeners have been found effective in Examples 1–3 in addition to those shown and within the range as specified above:

Chromic acid
Dichromic acid
Benzoic acid

The following antiseptics have been found effective in Examples 1–3 in addition to those shown and within the range as specified above:

Formalin
Thymol
Pentachlorophenol
Phenol
Dodecylhydroxy imidazoline
Borax

Example 4

A cylinder liner for a diesel engine, 850 mm. in diameter, 2000 mm. in height, and 50 mm. in wall thickness, was inspected for leaky defects due to blowholes. The cylinder was externally pressurized with an air pressure of 0.3 kg./cm.$^2$, and the inner surface was coated with a detecting agent of the composition shown hereinunder, by means of spraying or flow coating. Immediately upon application, the coated film bubbled at defective points. In 3 to 5 minutes the bubbles formed cocoon-like or globular spongy foam masses, clearly indicating the location of defective points.

As compared with the ordinary hydraulic testing method, the method of this invention was much superior to the accuracy of leakage detection, as shown in the following table:

TABLE III

| | Gas pressure method of the invention | Conventional hydraulic method |
|---|---|---|
| Number of leaks detected | 6 | 2 |

The detecting agent used in this example had the following composition:

| | Parts by weight |
|---|---|
| Adhesive promoter: Polyvinylacetate resin | 5 |
| Plasticizer: Dibutyl phthalate | 1 |
| Solvent: Ethyl acetate | 50 |
| Foaming agent: Sodium dioctylsulfosuccinate | 0.2 |

Aside from the polyvinylacetate resin, a number of other substances may be used for the adhesive promoter of the detecting agent, as for example, natural resins such as shellac, synthetic resins, such as phenolic resin, resorcinol resin, vinyl chloride and vinyl acetate copolymer resin, acetylcellulose, nitrocellulose, or natural isoprene rubber or synthetic rubber such as chloride, chloroprene, polyisobutylene, or nitrile rubber.

As a plasticizer there may be used dioctyl phthalate, tricresyl phosphate or other plasticizers commonly in use, as well as dibutyl phthalate. The solvent may be selected from a group consisting of aromates, aliphates, alcohols, ketones, esters and chlorinated hydrocarbons used either singly or as a mixture of several compounds. The foaming agent may be any compound soluble in the solvent to be used, and may be selected from the group consisting of anionic, nonionic, and cationic foaming agents defined hereinabove.

Example 5

The following composition was found suitable for use with the procedure of Example 4:

| | Parts by weight |
|---|---|
| Adhesive promoter: A copolymer of vinylchloride and vinyl acetate | 5 |
| Plasticizer: Tricresylphosphate | 1 |
| Solvent: | |
| Toluene | 30 |
| Methylisobutylketone | 20 |
| Foaming agent: Polyoxyethylenedodecylphenolether | 0.2 |

Since in both Examples 4 and 5 the solvent is an organic solvent, its preferred use is only in well ventilated areas.

As described in detail with reference to the foregoing Examples, the method of this invention differs from the ordinary methods of detecting gas leakage in pressurized structures through pressure changes, bubbling of lather, or by the reading of detecting instruments or thin film method. Rather, after applying the gas pressure to a structure, there is applied a leakage detecting agent to the surface of the structure, thereby to form solid spongy foam masses at the leaky defective points. The method of this invention enables inspection of the defective points to be made accurately and in foolproof manner at any time after the application of the detecting preparation. The foam mass lasts many hours and permits an inspector to be freed from time limitations and to inspect the structure without any waiting period. Furthermore, the method can use air as the detecting gas, eliminating the need for the addition of any noxious gas for the detecting purpose. Compressed air can be introduced or exhausted from the structures to be tested within a very short period of time, thereby enabling the defective points to be repaired, painted, or otherwise corrected immediately after inspection. Thus, the method according to the invention is highly advantageous in the saving of labor and insuring safety and sanitation of the working environments.

What is claimed is:

1. A gas pressure leakage inspection method for inspecting structures subjected to gas pressure for the presence of leaky defects, said method comprising applying gas pressure to the structure, then forming a coated film containing an adhesive agent mixed with a foaming agent and a solvent therefor on the area of the structure to be inspected for leakage, and allowing said coated film to produce long-durable spongy foam masses at the locations of the structure where compressed gas passed any leaks, said adhesive agent being present in an amount between 2–20% by weight and consisting essentially of a first substance selected from the group consisting of natural rubber, synthetic rubber or a bitumen, and a second substance which is gelatin.

2. A method as claimed in claim 1, in which the coated film further comprises an anti-rust agent, a hardening promoter, and a pigment filler.

3. A method as claimed in claim 1, wherein said first substance of the adhesive agent is present in an amount of 2 parts by weight, the foaming agent being sodium alkylarylsulfonate present in an amount of 0.2 part by weight, the gelatin being present in 2 parts by weight and the solvent is water in 100 parts by weight.

4. A method as claimed in claim 3, wherein said rubber is chloroprene rubber.

5. A method as claimed in claim 3, wherein said bitumen is selected from the group of asphalt and coal tar.

6. A method as claimed in claim 1, wherein said first substance of the adhesive agent is present in an amount of 3 parts by weight, the foaming agent being sodium dioctylsulfosuccinate which is present in an amount of 0.2 part by weight, the composition further comprising 1 part by weight of a plasticizer selected from the group consisting of dibutyl phthalate, tricresyl phosphate and dioctyl phthalate, the solvent being 50 parts by weight of ethyl acetate.

7. A method as claimed in claim 1 wherein said first substance is present in an amount between 0.95 and 4.5% by weight and the gelatin is present in an amount between 1.9 and 4.5% by weight.

8. A method as claimed in claim 7 wherein the foaming agent is sodium alkyl allylsulfonate.

References Cited

UNITED STATES PATENTS

| | | | |
|---|---|---|---|
| 3,326,035 | 6/1967 | Hirota et al. | 73—40 |
| 3,226,350 | 12/1965 | Smith et al. | 260—8 XR |
| 1,807,810 | 6/1931 | Rice | 252—307 |
| 2,544,691 | 4/1951 | Kugler et al. | 260—8 |
| 2,665,257 | 1/1954 | Potter | 252—307 |
| 2,890,148 | 6/1959 | Dede | 260—8 |
| 3,000,840 | 9/1961 | Johnson et al. | 260—8 |
| 3,035,005 | 5/1962 | Sampson | 106—4 |
| 3,212,897 | 10/1965 | Secrist | 260—8 |

OTHER REFERENCES

Irving Skeist "Handbook of Adhesives" 1962 (p. 12 and pp. 454–457) TP 986 S5 C.2 Copy in Group 140.

JAMES A. SEIDLECK, *Primary Examiner.*

ALEXANDER H. BRODMERKEL, *Examiner.*

T. MORRIS, *Assistant Examiner.*